US011396379B2

(12) United States Patent
Low

(10) Patent No.: US 11,396,379 B2
(45) Date of Patent: Jul. 26, 2022

(54) AIRPLANE WITH IMPROVED SAFETY

(71) Applicant: Steven Low, Gstaad (CH)

(72) Inventor: Steven Low, Gstaad (CH)

( * ) Notice: Subject to any disclaimer, the term of this patent is extended or adjusted under 35 U.S.C. 154(b) by 0 days.

(21) Appl. No.: 16/629,529

(22) PCT Filed: Apr. 1, 2019

(86) PCT No.: PCT/EP2019/000103
§ 371 (c)(1),
(2) Date: Jan. 8, 2020

(87) PCT Pub. No.: WO2019/192750
PCT Pub. Date: Oct. 10, 2019

(65) Prior Publication Data
US 2021/0362865 A1 Nov. 25, 2021

(30) Foreign Application Priority Data

Apr. 3, 2018 (NL) ..................... 1042808

(51) Int. Cl.
B64D 31/10 (2006.01)
B64D 33/00 (2006.01)
B64D 41/00 (2006.01)
B64D 33/02 (2006.01)
B64D 45/00 (2006.01)

(52) U.S. Cl.
CPC ............ *B64D 31/10* (2013.01); *B64D 33/00* (2013.01); *B64D 41/00* (2013.01); *B64D 2033/0213* (2013.01); *B64D 2041/002* (2013.01); *B64D 2045/0085* (2013.01); *B64D 2045/0095* (2013.01)

(58) Field of Classification Search
CPC ........ B64D 31/10; B64D 33/00; B64D 37/00; B64D 41/00; B64D 2033/0213; B64D 2041/002; B64D 2045/0085; B64D 2045/0095
See application file for complete search history.

(56) References Cited

U.S. PATENT DOCUMENTS

| 3,529,793 | A | | 9/1970 | Krongos | |
|---|---|---|---|---|---|
| 4,932,609 | A | * | 6/1990 | Secchiaroli | B64C 17/10 137/256 |
| 8,528,312 | B1 | | 9/2013 | Shammoh | |
| 2021/0214093 | A1 | * | 7/2021 | Bruno | B64D 31/04 |

FOREIGN PATENT DOCUMENTS

| CA | 2507280 | A1 | * | 11/2006 | ............. B64D 27/02 |
|---|---|---|---|---|---|
| CA | 2507280 | A1 | | 11/2006 | |

OTHER PUBLICATIONS

Warwick, Graham, AVWK, Skunk works Unveils MQX Details, 2009, http://deepbluehorizon.blogspot.com/2009/09/avwk-skunk-works-unveils-mqx-details.html; retrieved on Jul. 9, 2019.
International Search Report and Written Opinion issued in PCT/EP2019/000103 dated Jul. 29, 2019.

* cited by examiner

*Primary Examiner* — Valentina Xavier
(74) *Attorney, Agent, or Firm* — Troutman Pepper Hamilton Sanders LLP; Ryan A. Schneider

(57) ABSTRACT

An airplane has main propulsion engines and a first fuel supply for the main propulsion engines. The airplane further has an auxiliary propulsion engine and a second fuel supply for the auxiliary propulsion engine, this second fuel supply being separate from the first fuel supply. The auxiliary propulsion engine can be switched on independently from the main propulsion engines. Such airplane has increased safety, since it will be possible to maintain flight, particularly when at high altitude, even if all main propulsion engines have failed.

7 Claims, No Drawings

AIRPLANE WITH IMPROVED SAFETY

FIELD OF THE INVENTION

The present invention relates in general to the field of airplane design.

BACKGROUND OF THE INVENTION

Airplanes are typically provided with propulsion engines; the invention does not relate to gliders.

Propulsion engines can roughly be distinguished as propeller engines and jet engines. Larger planes, destined for larger distances and particularly intercontinental flights, invariably have jet engines.

The number of engines may vary. Many designs involve 2 engines, some involve 4 engines. There are also designs with 3 propulsion jet engines, one at each wing and one at the tail.

Engines can fail. Causes can be of a technical nature, but this will usually affect one engine only. Airplanes are designed such that they can safely continue with one engine off.

Events where more than one engine fails, and particularly events where ALL engines fail, are typically caused by a common cause, such as fuel shortage or objects entering the engines.

When all engines fail, the plane is left without thrust and will descend. It now behaves as a glider. It can be landed safely, if there is a landing place within reach of its glide path. This is for instance demonstrated by the famous Hudson River incident in 2009 (US Airways flight 1549) and the Gimli Glider incident in 1983 (Air Canada flight 143).

US Airways flight 1549 hit a flock of geese shortly after takeoff, at an altitude of just a few hundred meters. The descent lasted about 3 minutes. There are no real options in such situation.

Air Canada flight 143 ran out of fuel at high altitude, and consequently had more time, but it was cruising over an area where airports are scarce hence the number of available runways was low.

Both flights were lucky, in the sense that their captains were able to find a suitable, albeit unusual landing place, and capable to perform a safe landing. It is easy to imagine that the outcome of such incident would be much more disastrous if there are no suitable landing places within reach of the descending airplane. The captain has only limited possibilities to influence the descent angle if there is no thrust.

SUMMARY OF THE INVENTION

The present invention aims to provide a solution to this problem, in the sense of increasing the chances of finding a suitable landing spot to thus increase the chances on survival.

Of course, suitable landing spots can not be created or displaced. The captain has to do with the existing places. According to the invention, an airplane is provided with a safety provision that allows it to continue flight even after shutdown of the main propulsion engines.

To this effect, an airplane in accordance with the present invention is provided with a spare auxiliary propulsion jet engine, and an auxiliary fuel supply exclusively designated for the spare auxiliary propulsion jet engine and independent from the fuel supply for the main propulsion jet engines. Also, electric circuitry for the spare auxiliary propulsion jet engine should be totally independent. On the other hand, instruments and hydraulics should be capable of being powered from the spare auxiliary propulsion jet engine.

It is noted that most commercial airplanes have an auxiliary power unit (APU), which includes a fuel-consuming engine, usually a turbine, that drives a generator for generating electrical power when the main engines are off at the gate. This provides power for instruments, air conditioning, etc. It also provides the power to start the main turbine engines. And, in the case of a full engine failure, it is indeed a safety feature per se in the sense that it can be switched on to provide power to the instruments and all other flight systems. Such auxiliary power unit is however not a flight propulsion engine. It is further to be noted that such auxiliary power unit is supplied from the same fuel supply as the propulsion engines.

There have been proposals for planes with electric motors in the wheels, powered by the APU during taxi, but that is not a propulsion during flight.

The inventive concept provided by the inventor involves basically a spare propulsion engine, having the function of a range extender. Under normal conditions, the spare propulsion engine would not be used, such as to ensure that this engine remains ready for operation when a dramatic event occurs that affects all running engines. Otherwise, it would just be an additional one of the main propulsion engines, which could be affected by the same cause that shuts down the other engines. If it does not have a separate fuel supply, fuel exhaustion would also affect the "additional" engine. If it would be operating and hence be receiving air for combustion, any objects in the air (for instance birds) could also damage the "additional" engine. The whole idea is to keep this spare engine safe, so that it can save the airplane.

Thus, in the airplane design proposed by the inventor, the plane would have two or three or four (or even more) main engines, at least one APU driving a generator for electrical power, and a spare propulsion engine.

To protect the spare propulsion engine, it preferably is provided with a protective cap or cover or lid over its air intake opening, and preferably also over its air outlet opening. This protective element has a normal protection position, in which it protects the corresponding engine, and this protective element is in its normal protection position during flight. The protective element also has a release position in which it does not cover the corresponding engine opening. The protective element is controllable, and can be controlled by the captain and/or by the system's computer to be displaced from the normal protection position to the release position while in flight.

The size of the spare propulsion engine may be a matter of design choice. The bigger it is, the more thrust it can provide, but it will also add to the plane's dead weight.

For being able to maintain flight, it does not need to be as powerful as the main engines. The highest power requirements occur during takeoff and low-altitude flight. When cruising at high altitude, where the air is less dense, less power is needed to overcome the air resistance and maintain altitude as compared to low altitude. And maintaining altitude is a safety issue.

It would already be an improvement if such spare propulsion engine would provide power less than needed for actually maintaining altitude, because it would in any case decrease the descent angle and hence increase the remaining flight range, and consequently increase the chances of finding a suitable landing spot.

A further matter of design choice will be the issue of how long the spare propulsion engine is expected to operate. This translates to a corresponding size of the auxiliary fuel supply, with associated weight.

For instance, Air Canada flight 143 was cruising at high altitude, reportedly some 200 kilometers from Winnipeg. When all engines failed and the glide path started, it was at about 12 km height. The descent rate was about 600 m/min at a ratio of about 10:1. This means that a descent duration of about 24 minutes and a descent range of about 120 km would be available. If a relatively small spare propulsion engine is capable of providing sufficient thrust so that the descent rate is reduced to, for instance, 100 m/min, the remaining range would be about 700 km with a descent duration of about 2.5 h, in other words a fuel supply for a duration of about 2.5 hours would be needed.

It should be clear to a person skilled in the art that the present invention is not limited to the exemplary embodiments discussed above, but that several variations and modifications are possible within the protective scope of the invention as defined in the appending claims. Even if certain features are recited in different dependent claims, the present invention also relates to an embodiment comprising these features in common. Even if certain features have been described in combination with each other, the present invention also relates to an embodiment in which one or more of these features are omitted. Features which have not been explicitly described as being essential may also be omitted.

The invention claimed is:

1. An airplane comprising:
    main propulsion jet engines;
    a first fuel supply for the main propulsion jet engines;
    a spare auxiliary propulsion jet engine;
    a second fuel supply for the spare auxiliary propulsion jet engine; and
    protective cover elements configured to:
        cover air intake and outlet openings of the spare auxiliary propulsion jet engine during flight; and
        be controllable to be released during flight;
    wherein the second fuel supply is completely separate from the first fuel supply and dedicated for supplying the spare auxiliary propulsion jet engine only;
    wherein the spare auxiliary propulsion jet engine can be switched on independently from the main propulsion jet engines;
    wherein the protective cover elements have:
        normal protection positions in which they protect the spare auxiliary propulsion jet engine; and
        release positions in which they not cover the corresponding spare auxiliary propulsion jet engine openings; and
    wherein the airplane has:
        a normal flight mode in which the main propulsion jet engines are used and the spare auxiliary propulsion jet engine is not used, wherein the protective cover elements are in their normal protection positions; and
        an emergency flight mode in a case of a failure of all main propulsion jet engines, wherein the protective cover elements are in their release positions and the spare auxiliary propulsion jet engine is used.

2. The airplane according to claim 1, wherein in the normal flight mode, the spare auxiliary propulsion jet engine is not used to ensure that the spare auxiliary propulsion jet engine remains ready for use in the case of the failure of all main propulsion jet engines; and
    wherein in the emergency flight mode, the spare auxiliary jet engine is used to provide thrust to decrease the plane's descent angle.

3. The airplane according to claim 1, wherein the spare auxiliary propulsion jet engine is sufficiently powerful to maintain high altitude.

4. The airplane according to claim 1, wherein the spare auxiliary propulsion jet engine is less powerful than the individual main propulsion jet engines.

5. The airplane according to claim 1 further comprising:
    an auxiliary power unit; and
    an electric generator powered by the auxiliary power unit;
    wherein the auxiliary power unit comprises a fuel consuming engine different from the spare auxiliary propulsion jet engine and supplied from a fuel supply different from the second fuel supply.

6. A method of operating the airplane according to claim 1 comprising:
    operating the airplane in the normal flight mode with propulsion provided by the main propulsion jet engines and the spare auxiliary propulsion jet engine switched off; and
    in the case of the failure of all main propulsion jet engines:
        displacing the protective cover elements from the normal protection positions to the release positions while in flight; and
        operating the airplane in the emergency flight mode with propulsion provided by the spare auxiliary propulsion jet engine.

7. An airplane comprising:
    main propulsion jet engines;
    a spare auxiliary propulsion jet engine that is less powerful than the individual main propulsion jet engines;
    a first fuel supply for the main propulsion jet engines;
    a second fuel supply for the spare auxiliary propulsion jet engine completely separate from the first fuel supply and dedicated for supplying the spare auxiliary propulsion jet engine only;
    an auxiliary power unit comprising a fuel consuming engine different from the spare auxiliary propulsion jet engine and supplied from a fuel supply different from the second fuel supply;
    an electric generator powered by the auxiliary power unit; and
    protective cover elements configured to:
        cover air intake and outlet openings of the spare auxiliary propulsion jet engine during flight; and
        be controllable to be released during flight;
    wherein the spare auxiliary propulsion jet engine can be switched on independently from the main propulsion jet engines;
    wherein the protective cover elements have:
        normal protection positions in which they protect the spare auxiliary propulsion jet engine; and
        release positions in which they not cover the corresponding spare auxiliary propulsion jet engine openings; and
    wherein the airplane has:
        a normal flight mode in which the main propulsion jet engines are used and the spare auxiliary propulsion jet engine is not used, wherein the protective cover elements are in their normal protection positions; and
        an emergency flight mode in a case of a failure of all main propulsion jet engines, wherein the protective cover elements are in their release positions and the spare auxiliary propulsion jet engine is used.

* * * * *